United States Patent
Zhao et al.

(10) Patent No.: US 11,831,151 B2
(45) Date of Patent: Nov. 28, 2023

(54) PHOTOVOLTAIC ELECTRIC APPLIANCE SYSTEM, METHOD AND DEVICE OF CONTROLLING VOLTAGE PROTECTION VALUE THEREOF

(71) Applicant: Gree Electric Appliances, Inc. of Zhuhai, Guangdong (CN)

(72) Inventors: Zhigang Zhao, Guangdong (CN); Dongrui Qu, Guangdong (CN); Chongyang Feng, Guangdong (CN); Xuefen Zhang, Guangdong (CN); Shiyong Jiang, Guangdong (CN); Han Liu, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 365 days.

(21) Appl. No.: 17/287,919

(22) PCT Filed: Aug. 23, 2019

(86) PCT No.: PCT/CN2019/102245
§ 371 (c)(1),
(2) Date: Apr. 22, 2021

(87) PCT Pub. No.: WO2020/093758
PCT Pub. Date: May 14, 2020

(65) Prior Publication Data
US 2021/0384721 A1    Dec. 9, 2021

(30) Foreign Application Priority Data
Nov. 8, 2018    (CN) .................. 201811326788.X

(51) Int. Cl.
*H02H 7/20*    (2006.01)
*H02S 40/30*    (2014.01)
(Continued)

(52) U.S. Cl.
CPC ............ *H02H 7/20* (2013.01); *H02H 1/0007* (2013.01); *H02J 3/381* (2013.01); *H02S 40/30* (2014.12); *H02J 2300/24* (2020.01)

(58) Field of Classification Search
CPC ..... H02H 1/0007; H02H 7/20; H02J 2300/24; H02J 2310/14; H02J 3/381; H02J 3/383;
(Continued)

(56) References Cited

U.S. PATENT DOCUMENTS

| | | | |
|---|---|---|---|
| 6,605,881 B2* | 8/2003 | Takehara | H02J 3/381 307/64 |
| 2002/0067628 A1* | 6/2002 | Takehara | H02J 3/381 363/95 |

(Continued)

FOREIGN PATENT DOCUMENTS

| | | |
|---|---|---|
| CN | 201252413 Y | 6/2009 |
| CN | 201328089 Y | 10/2009 |

(Continued)

OTHER PUBLICATIONS

IEEE—"IEEE Recommended Practice for Utility Interface of Photovoltaic (PV) Systems," in IEEE Std 929-2000. Retrieved from Internet:https://ieeexplore.ieee.org/stamp/stamp.jsp?tp=&arnumber=836389 (Year: 2000).*

*Primary Examiner* — Jared Fureman
*Assistant Examiner* — Nicolas Bellido
(74) *Attorney, Agent, or Firm* — The Webb Law Firm

(57) ABSTRACT

The disclosure provides a photovoltaic electric appliance system and a voltage protection value control method and apparatus thereof, and a controller. The photovoltaic electric appliance system includes: a photovoltaic power generation module, an electric appliance, and a grid-connection module. Said control method comprises-: acquiring the working states of the photovoltaic power generation module, the electric appliance and the grid-connection module; and according to the working states of each, determining an operation mode of the photovoltaic electric appliance system, and setting a voltage protection range of the photovoltaic electric appliance system according to the operation mode. By determining whether the grid-connection module is working, whether the electric appliance is working, and whether the photovoltaic power generation module is work- (Continued)

ing, and by setting voltage protection values respectively for different working modes, the invention achieves the effect of compatibility of protection values and improves the system performance.

20 Claims, 4 Drawing Sheets

(51) Int. Cl.
  H02H 1/00 (2006.01)
  H02J 3/38 (2006.01)
(58) Field of Classification Search
  CPC ..... H02S 40/30; Y02B 70/30; Y02B 70/3225; Y02E 10/56; Y04S 20/222; Y04S 20/242
  See application file for complete search history.

(56) References Cited

U.S. PATENT DOCUMENTS

2009/0160259 A1 6/2009 Naiknaware et al.
2011/0067744 A1 3/2011 Ou
2011/0175565 A1 7/2011 Lee
2018/0331541 A1* 11/2018 Dong .................. F25B 27/002

FOREIGN PATENT DOCUMENTS

| CN | 101345500 B | | 9/2010 |
|---|---|---|---|
| CN | 102130467 A | | 7/2011 |
| CN | 102460878 A | | 5/2012 |
| CN | 202374195 U | | 8/2012 |
| CN | 102705944 A | | 10/2012 |
| CN | 202696178 U | | 1/2013 |
| CN | 202696178 U | * | 1/2013 |
| CN | 103486682 A | | 1/2014 |
| CN | 203586455 U | | 5/2014 |
| CN | 203645345 U | | 6/2014 |
| CN | 203707743 U | | 7/2014 |
| CN | 104135027 A | | 11/2014 |
| CN | 104734177 A | | 6/2015 |
| CN | 105680472 A | | 6/2016 |
| CN | 106385057 A | | 2/2017 |
| CN | 104242337 B | * | 5/2017 |
| CN | 109494788 A | | 3/2019 |
| JP | 2016039759 A | | 3/2016 |
| WO | 2009145380 A1 | | 12/2009 |

* cited by examiner

PHOTOVOLTAIC ELECTRIC APPLIANCE SYSTEM, METHOD AND DEVICE OF CONTROLLING VOLTAGE PROTECTION VALUE THEREOF

CROSS-REFERENCE TO RELATED APPLICATION

The present application is a National Stage of International Application No. PCT/CN2019/102245 filed on Aug. 23, 2019, which claims the priority of the Chinese patent application No. 201811326788.X, entitled "PHOTOVOLTAIC ELECTRIC APPLIANCE SYSTEM, AND METHOD OF CONTROLLING VOLTAGE PROTECTION VALUE THEREOF AND APPARATUS THEREOF" and filed on Nov. 8, 2018, both of which are incorporated herein by reference in their entireties.

BACKGROUND OF THE INVENTION

Field of the Invention

The present disclosure relates to the technical field of home appliances, in particular to a photovoltaic electric appliance system, a method and a device of controlling a voltage protection value thereof.

Description of Related Art

Traditional electric appliances, such as common household appliances, are supplied energy from an alternating current (AC) grid. For example, in an air conditioner, traditional air conditioner indoor and outdoor units are AC air conditioner indoor and outdoor units. With continuous development of the photovoltaic industry, there is an increasingly obvious trend of photovoltaic and air conditioner combination, and corresponding photovoltaic and air conditioner combining products have emerged. Due to the use of a photovoltaic cell as a power supply for the air conditioner, such products not only are energy-saving, but also achieve environment protection, and thus have a good development prospect. However, as the power generation capacity of a solar panel continues to increase, in addition to energy for an air conditioning system, there may be excess energy generated, and this part of energy will be used to generate power through a traditional photovoltaic inverter to be fed back to a power grid. A photovoltaic air conditioner can meet both requirements of grid-connected photovoltaic power generation and the use of the air conditioner.

SUMMARY OF THE INVENTION

According to one or more embodiments of the present disclosure, a method of controlling a voltage protection value of an electric appliance system is provided, the photovoltaic electric appliance system including: a photovoltaic power generation module, an electric appliance, and a grid-connection module, electric energy generated by the photovoltaic power generation module being used for at least one of supplying to the electric appliance, or feeding to a grid through the grid-connection module, the method including: acquiring work states of the photovoltaic power generation module, the electric appliance and the grid-connection module; determining an operation mode of the photovoltaic electric appliance system according to the work states of the photovoltaic power generation module, the electric appliance and the grid-connection module, the operation mode including: an all-photovoltaic power generation mode in which the electric energy generated by the photovoltaic power generation module is completely used for feeding to the grid through the grid-connection module, or a non-all-photovoltaic power generation mode in which the electric energy generated by the photovoltaic power generation module is partially or completely supplied to the electric appliance, or in which the photovoltaic power generation module is turned off and an AC grid is used to provide electric energy for operation of the electric appliance.

In some embodiments, determining an operation mode of the photovoltaic electric appliance system according to the work states of the photovoltaic power generation module, the electric appliance and the grid-connection module includes: determining work states of the photovoltaic power generation module, the electric appliance and the grid-connection module, respectively; in the case where the grid-connection module is in a working state, the electric appliance is in a non-working state, and the photovoltaic power generation module is in a working state, determining that the operation mode of the photovoltaic electric appliance system is the all-photovoltaic power generation mode; and setting a voltage protection range of the photovoltaic electric appliance system according to the operation mode includes: in the case where the electric energy generated by the photovoltaic power generation module is completely used for feeding to the grid through the grid-connection module, setting the voltage protection range of the photovoltaic electric appliance system as a first voltage protection range, wherein the first voltage protection range is used for protection in the case where the electric energy generated by the photovoltaic power generation module is completely used for feeding to the grid through the grid-connection module.

In some embodiments, determining an operation mode of the photovoltaic electric appliance system according to the work states of the photovoltaic power generation module, the electric appliance and the grid-connection module includes: determining work states of the photovoltaic power generation module, the electric appliance and the grid-connection module, respectively; in the case of at least one of the situations where the grid-connection module is in a non-working state, the electric appliance is in a working state, or the photovoltaic power generation module is in a non-working state, determining that the operation mode of the photovoltaic electric appliance system is the non-all-photovoltaic power generation mode; and setting a voltage protection range of the photovoltaic electric appliance system according to the operation mode includes: in the case where the electric energy generated by the photovoltaic power generation module is partially or completely supplied to the electric appliance, setting the voltage protection range of the photovoltaic electric appliance system as a second voltage protection range, wherein the second voltage protection range is used for protection in the case where the electric energy generated by the photovoltaic power generation module is supplied to the electric appliance.

In some embodiments, the method further including: setting a voltage range for operation of the electric appliance according to the second voltage protection range after setting the voltage protection range of the photovoltaic electric appliance system as the second voltage protection range, wherein the voltage range for operation of the electric appliance is less than or equal to the second voltage protection range.

In some embodiments, in the case where the operation mode of the photovoltaic electric appliance system is that the electric energy generated by the photovoltaic power generation module is partially or completely supplied to the electric appliance, the method further includes: determining whether the electric energy generated by the photovoltaic power generation module is greater than electric energy consumption of the electric appliance; determining whether an upper limit of the second protection range is greater than an upper limit of the first protection range if the electric energy generated by the photovoltaic power generation module is greater than the electric energy consumption of the electric appliance, and if so, controlling the photovoltaic power generation module to operate at a limited power.

In some embodiments, if the upper limit of the second protection range is less than the upper limit of the first protection range, switching the voltage protection range of the photovoltaic electric appliance system to the first voltage protection range, and supplying the electric energy generated by the photovoltaic power generation module to the electric appliance and feeding the electric energy to the grid through the grid-connection module at the same time.

In some embodiments, if the electric energy generated by the photovoltaic power generation module is less than the electric energy consumption of the electric appliance, the electric energy generated by the photovoltaic power generation module is controlled to be completely used for providing electric energy to the electric appliance, and electric energy is supplemented from the power grid for use by the electric appliance.

According to one or more embodiments of the present disclosure, a method of controlling a voltage protection value of a photovoltaic electric appliance system is provided, the photovoltaic electric appliance system including: a photovoltaic power generation module, an electric appliance, and a grid-connection module, electric energy generated by the photovoltaic power generation module being used for at least one of supplying to the electric appliance, or feeding to a grid through the grid-connection module, the method including: acquiring work states of the photovoltaic power generation module, the electric appliance and the grid-connection module; determining an operation mode of the photovoltaic electric appliance system according to the work states; and setting a voltage protection range of the photovoltaic electric appliance system according to the operation mode.

In some embodiments, the operation mode includes: an all-photovoltaic power generation mode in which the electric energy generated by the photovoltaic power generation module is completely fed to the grid through the grid-connection module, or a non-all-photovoltaic power generation mode in which the electric energy generated by the photovoltaic power generation module is partially or completely supplied to the electric appliance, or in which the power generation module is turned off and an AC grid is used to provide electric energy for operation of the electric appliance.

In some embodiments, determining an operation mode of the photovoltaic electric appliance system according to the work states includes: in the case where the grid-connection module is in a working state, the electric appliance is in a non-working state, and the photovoltaic power generation module is in a working state, determining that the operation mode of the photovoltaic electric appliance system is the all-photovoltaic power generation mode; and setting a voltage protection range of the photovoltaic electric appliance system according to the operation mode includes: in the case where the electric energy generated by the photovoltaic power generation module is completely fed to the grid through the grid-connection module, setting the voltage protection range of the photovoltaic electric appliance system as a first voltage protection range, wherein the first voltage protection range is used for protection in the case where the electric energy generated by the photovoltaic power generation module is completely fed to the grid through the grid-connection module.

In some embodiments, determining an operation mode of the photovoltaic electric appliance system according to the work states includes: in the case where the grid-connection module is in a non-working state, and at least one of the electric appliance in a working state or the photovoltaic power generation module in a non-working state is satisfied, determining that the operation mode of the photovoltaic electric appliance system is the non-all-photovoltaic power generation mode in which the electric energy generated by the photovoltaic power generation module is partially or completely supplied to the electric appliance for operation; and setting a voltage protection range of the photovoltaic electric appliance system according to the operation mode includes: in the non-all-photovoltaic power generation mode, setting the voltage protection range of the photovoltaic electric appliance system as a second voltage protection range, wherein the second voltage protection range is used for protection in the case where the electric energy generated by the photovoltaic power generation module is supplied to the electric appliance for operation.

According to one or more embodiments of the present disclosure, a device of controlling a voltage protection value of a photovoltaic electric appliance system is provided, the photovoltaic electric appliance system including a photovoltaic power generation module, an electric appliance, and a grid-connection module, the control apparatus including: an acquisition module configured to acquire work states of the photovoltaic power generation module, the electric appliance and the grid-connection module; an operation mode determination module configured to determine an operation mode of the photovoltaic electric appliance system according to the work states of the photovoltaic power generation module, the electric appliance and the grid-connection module, the operation mode including: a mode in which the electric energy generated by the photovoltaic power generation module is completely fed to the grid through the grid-connection module, or a mode in which the electric energy generated by the photovoltaic power generation module is partially or completely supplied to the electric appliance for operation; and a setting module configured to set a voltage protection range of the photovoltaic electric appliance system according to the operation mode.

According to one or more embodiments of the present disclosure, a device of controlling a voltage protection value of a photovoltaic electric appliance system is provided, the photovoltaic electric appliance system including: a photovoltaic power generation module, an electric appliance, and a grid-connection module, the control apparatus including: an acquisition module configured to acquire work states of the photovoltaic power generation module, the electric appliance and the grid-connection module; an operation mode determination module configured to determine an operation mode of the photovoltaic electric appliance system according to the work states; and a setting module configured to set a voltage protection range of the photovoltaic electric appliance system according to the operation mode.

According to one or more embodiments of the present disclosure, a controller is provided, including: at least one processor; and a memory communicably connected with the at least one processor, wherein the memory stores instructions executable by at least one processor, and the instructions are executed by the at least one processor to cause the at least one processor, so as to execute the method of controlling a voltage protection value of a photovoltaic electric appliance system of any implementation of the first aspect described above.

According to one or more embodiments of the present disclosure, a photovoltaic electric appliance system is provided, including a photovoltaic power generation module, an electric appliance, a grid-connection module, a detection module, and the controller of the third aspect described above, wherein the photovoltaic power generation module is connected to the electric appliance and the grid-connection module to supply power to at least one of a power grid or the electric appliance; and the detection module is connected to the photovoltaic power generation module, the electric appliance and the grid-connection module, for detecting work states of the photovoltaic power generation module, the electric appliance and the grid-connection module.

In some embodiments, the electric appliance includes at least one of an air conditioner, a refrigerator, a washing machine, or a fan.

BRIEF DESCRIPTION OF THE DRAWINGS

To describe the technical solutions in the embodiments of the present disclosure or in the related art more clearly, a brief introduction to the drawings that need to be used in description of the embodiments or the related art will be given below. Obviously, the drawings described below illustrate some embodiments of the present disclosure, and to those of ordinary skill in the art, other drawings may also be obtained based on these drawings without creative work.

DETAILED DESCRIPTION OF THE INVENTION

Technical solutions of the present disclosure will be described below clearly and completely in conjunction with the accompanying drawings. Obviously, the described embodiments are part of, instead of all of embodiments of the present disclosure. Based on the embodiments in the present disclosure, all other embodiments obtained by those of ordinary skill in the art without making creative efforts fall within the protection scope of the present disclosure.

The inventor of the present disclosure has discovered a shortcoming in the related art described above: in a photovoltaic electric appliance, in the process of combining the electric appliance with a photovoltaic inverter to meet both requirements of grid-connected photovoltaic power generation and the use of the electric appliance, there is a problem that a voltage protection value in grid connection and a voltage protection value in the use of the electric appliance are incompatible and not matched. In view of this, embodiments of the present disclosure provide a photovoltaic electric appliance system, a method and a device of controlling a voltage protection value thereof, and a controller.

In application of the technical solutions of the present disclosure, by means of the determination processing of determining whether the grid-connection module is working, whether the electric appliance is working, and whether the photovoltaic power generation module is working, and by setting voltage protection values respectively for different work modes according to results of corresponding determination conditions, the effect of compatibility of protection values is achieved, and the system performance is improved.

Figure 1:
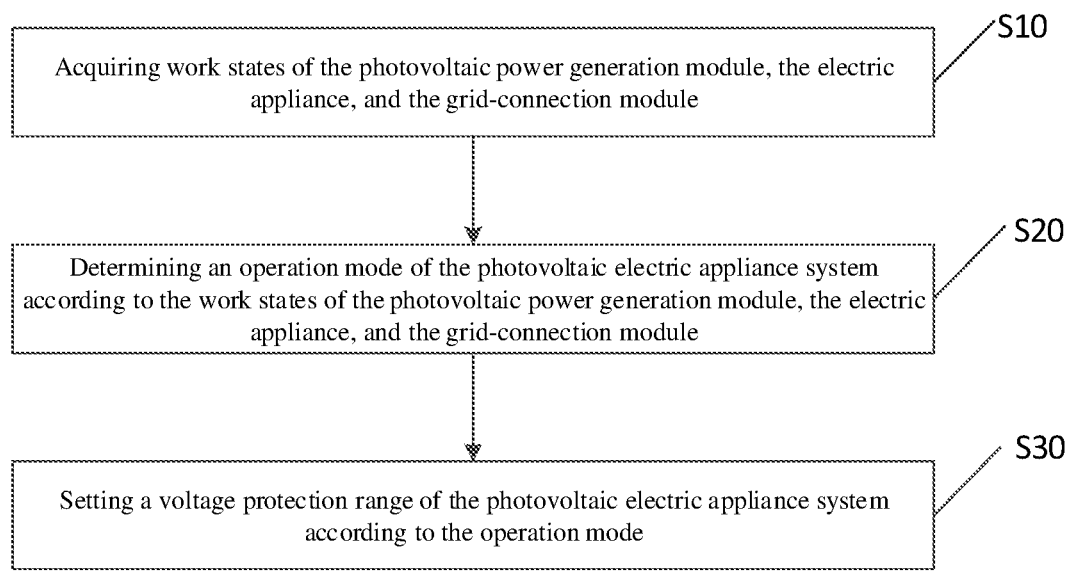
FIG. 1 shows a schematic diagram of some embodiments of a method of controlling a voltage protection value of a photovoltaic electric appliance system provided in the present disclosure.
Figure 5:
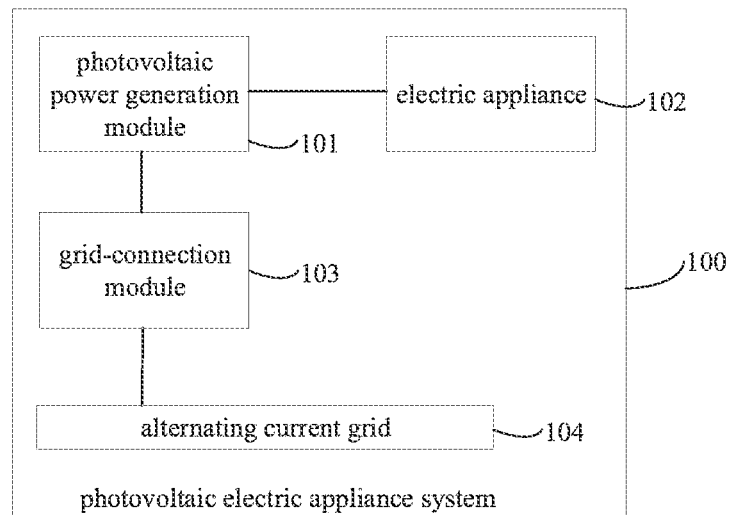
FIG. 5 shows a module diagram of some embodiments of the photovoltaic electric appliance system.
Figure 6:
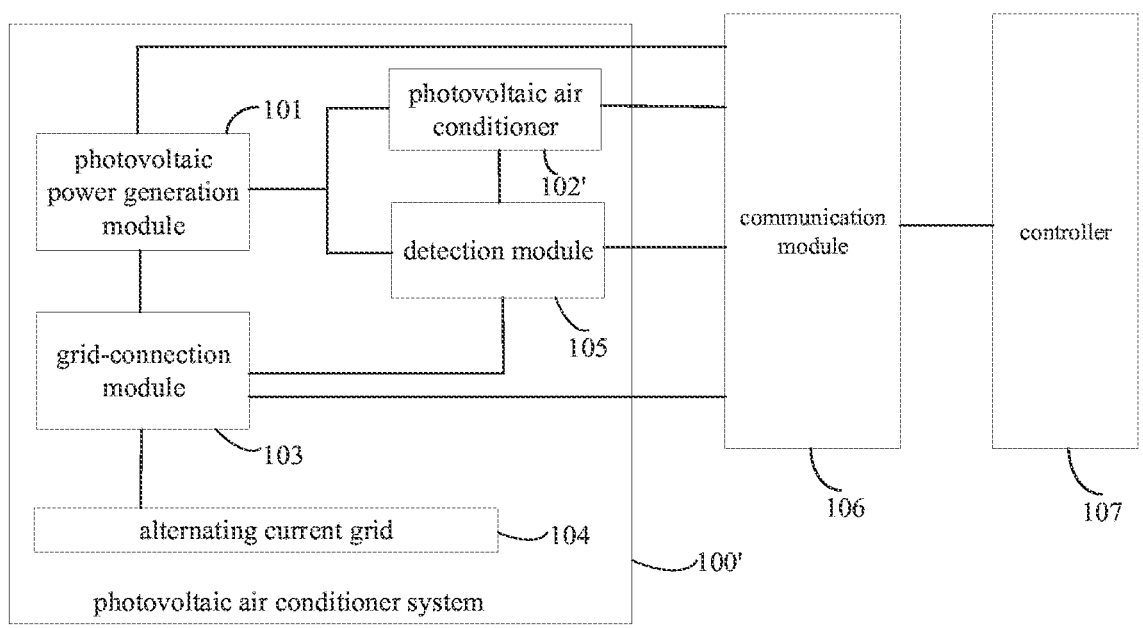
FIG. 6 shows a module diagram of some other embodiments of the photovoltaic electric appliance system.

Some embodiments of the present disclosure provide a method of controlling a voltage protection value of a photovoltaic electric appliance system. As shown in FIG. 5 and FIG. 6, electric appliances 102 may include: a photovoltaic air conditioner 102' (abbreviated as air conditioning), a photovoltaic refrigerator, a photovoltaic washing machine, a photovoltaic fan and other household appliances. In some embodiments, a photovoltaic air conditioner 102' can be used as an example for description. A so-called photovoltaic electric appliance system 100 includes: a photovoltaic power generation module 101, an air conditioner 102', and a grid-connection module 103. The photovoltaic power generation module 101 is used to supply power to the air conditioner 102'. When the power generated by the photovoltaic power generation module 101 is insufficient, a power grid is an alternating current grid 104 and can be used for power supply. When there is excess power generated by the photovoltaic power generation module 101, in addition to power supply to the air conditioner 102', it can be used by the grid-connection module 103 for grid connection to be fed back to the power grid. During air conditioner operation and grid connection, due to different standards for photovoltaic grid connection and air conditioner operation, voltage protection values required therefor are different, and even differ greatly, resulting in that the voltage protection value for grid connection with the photovoltaic power generation module 101 and the voltage protection value for use of the air conditioner 102' are incompatible and not matched. The method of controlling a voltage protection value of the photovoltaic air conditioning system provided by this embodiment can achieve compatibility of the voltage protection values required during operation of the air conditioner 102' and grid connection to solve the above problem. As shown in FIG. 1, the method may include steps S10-S30:

S10. Acquiring work states of the photovoltaic power generation module 101, the electric appliance 102 and the grid-connection module 103.

In some embodiments, using an air conditioner 102' as an example for description, the photovoltaic power generation module 101, the air conditioner 102', and the grid-connection module 103 can be detected by at least one of a current sensor or a voltage sensor, and can be determined to be in a working state if a detected current or voltage reaches a preset value. In some embodiments, the work state of the photovoltaic power generation module 101 can be detected by detecting a work state of a direct current/direct current (DC/DC) module of the power generation module; the describe the technical solutions more clearly work state of the air conditioner 102' can be detected by detecting a work state of a compressor of the air conditioner 102'; and the grid-connection module 103 can be detected by detecting a work state of a DC/AC module of the grid-connection module 103.

S20. Determining an operation mode of the photovoltaic electric appliance system according to the work states of the photovoltaic power generation module 101, the electric appliance 102 and the grid-connection module 103.

In some embodiments, using an air conditioner 102' as an example, the so-called operation mode includes: an all-photovoltaic power generation mode in which the electric energy generated by the photovoltaic power generation module 101 is completely fed to the grid through the grid-connection module 103, or a non-all-photovoltaic power generation mode in which the electric energy generated by the photovoltaic power generation module 101 is partially or completely supplied to the air conditioner 102', or in which the photovoltaic power generation module 101 is turned off and an AC grid is used to provide electric energy for operation of the electric appliance 102. Due to different standards for the all-photovoltaic power generation mode in photovoltaic grid connection, and the non-all-photovoltaic power generation mode when the air conditioner 102' is operating, different voltage protection values are required, and therefore, different voltage protection ranges are required therefor.

S30. Setting a voltage protection range of the photovoltaic electric appliance system is set according to the operation mode.

In some embodiments, by means of the determination processing of determining whether the grid-connection module 103 is working, whether the electric appliance 102 is working, and whether the photovoltaic power generation module 101 is working, and by setting voltage protection ranges respectively for different work modes according to results of corresponding determination conditions, the effect of compatibility of protection values is achieved, and the system performance is improved.

Figure 2:
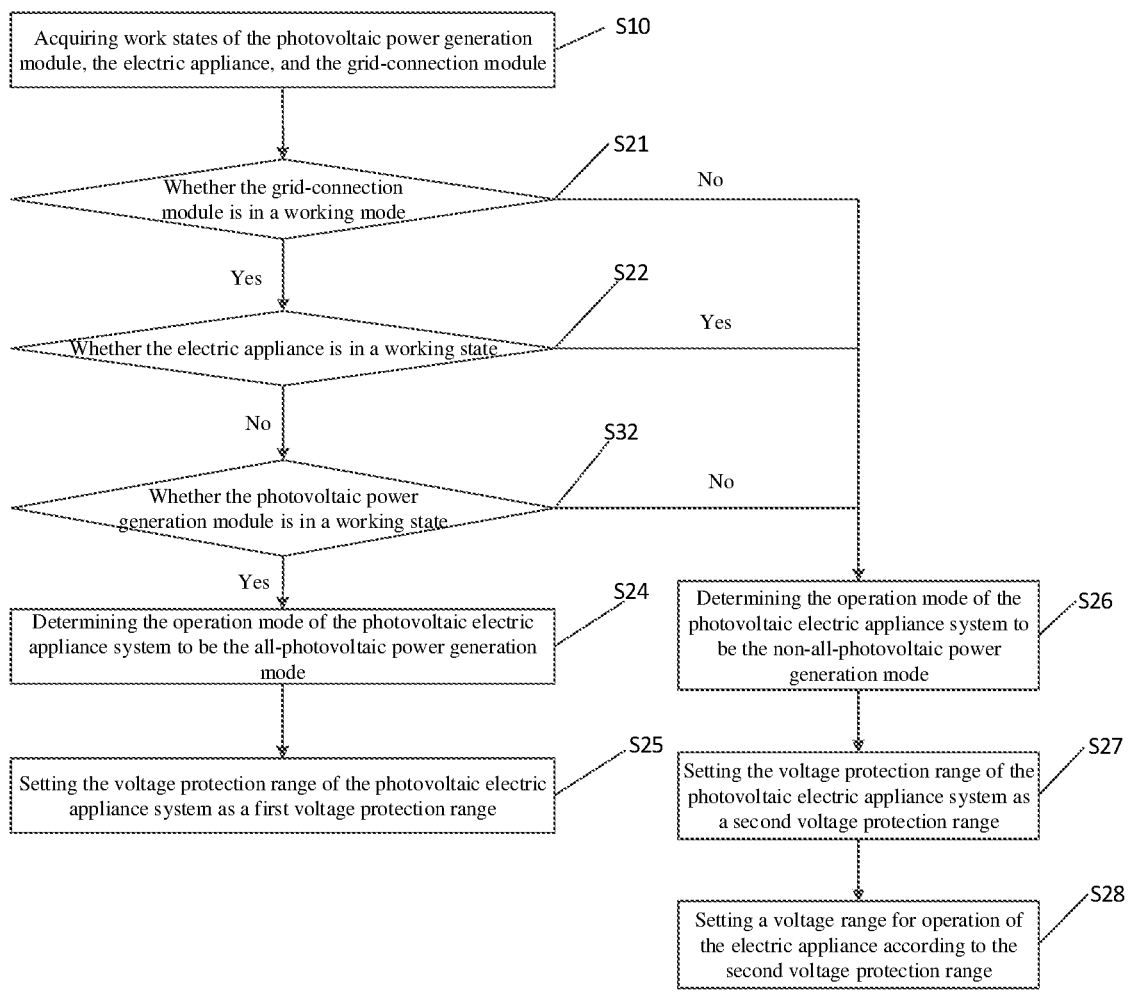
FIG. 2 shows a schematic diagram of some other embodiments of a method of controlling a voltage protection value of a photovoltaic electric appliance system provided in the present disclosure.

In an optional embodiment, as shown in FIG. 2, step S20 may include steps S21-S28:

S21. Determining whether the grid-connection module 103 is in a working mode. If the grid-connection module 103 is in the working mode, step S22 is executed. If the grid-connection module 103 is in a non-working mode, step S23 is executed.

S22. Determining whether the electric appliance 102 is in a working state. If the electric appliance 102 is in a non-working mode, step S23 is executed. If the electric appliance 102 is in the working mode, step S26 is executed.

S23. Determining whether the photovoltaic power generation module 101 is in a working state is determined. If the photovoltaic power generation module 101 is in the working mode, step S24 is executed. If the photovoltaic power generation module 101 is in a non-working mode, step S26 is executed.

The determination of the above steps S21-S23 is only exemplary determination of the operation state of the photovoltaic electric appliance system, and the determination sequence is not limited to the above step sequence, and the sequence of the steps S21-S23 can be changed arbitrarily.

S24. Determining the operation mode of the photovoltaic electric appliance system to be the all-photovoltaic power generation mode.

In some embodiments, using an air conditioner 102' as an example for description, in the case where the three conditions that the grid-connection module 103 is in a working state, the air conditioner 102' is in a non-working state, and the photovoltaic power generation module 101 is in a working state are satisfied, it can be determined that the electric energy generated by the photovoltaic power generation module 101 is completely fed to the grid, which is the all-photovoltaic power generation mode.

S25. Setting the voltage protection range of the photovoltaic electric appliance system to a first voltage protection range.

In some embodiments, using an air conditioner 102' as an example for description, the first voltage protection range is used for protection when the electric energy generated by the photovoltaic power generation module 101 is completely fed to the grid through the grid-connection module 103. The so-called first voltage protection range value can be 85%-110% of the rated voltage.

S26. Determining the operation mode of the photovoltaic electric appliance system to be the non-all-photovoltaic power generation mode.

In some embodiments, using an air conditioner 102' as an example for description, in the case of at least one of the situations where the grid-connection module 103 is in a non-working state, and at least one of the electric appliance 102 is in a working state, or the photovoltaic power generation module 101 is in a non-working state is satisfied, it can be determined that the air conditioner 102' in the photovoltaic air conditioning system is operating, and the electric energy generated by the photovoltaic power generation module 101 is partially or completely used for operation of the air conditioner 102', which is the non-all-photovoltaic power generation mode.

S27. Setting the voltage protection range of the photovoltaic electric appliance system to a second voltage protection range.

In some embodiments, using an air conditioner 102' as an example for description, the second voltage protection range is used for protection when the electric energy generated by the photovoltaic power generation module 101 is supplied to the air conditioner 102'. The so-called second voltage protection range value can be 80%-115% of the rated voltage.

To ensure operation safety of the electric appliance 102, after step S27, the method may further include:

S28. Setting a voltage range for operation of the electric appliance 102 according to the second voltage protection range.

In some embodiments, using an air conditioner 102' as an example for description, the set voltage range for operation of the air conditioner 102' is less than or equal to the second voltage protection range, so that damage to the air conditioner 102' can be avoided.

Through the triple determination of the work states of the photovoltaic power generation module 101, the electric appliance 102, and the grid-connection module 103, when the grid-connection module 103 is in the working state, the electric appliance 102 is in the non-working state, and the power generation module is in the working state, the system is in the all-photovoltaic power generation state in which power generated by the photovoltaic power generation module 101 is completely used for grid connection. In this case, the voltage protection value range of the system can be set to the first voltage protection range, which is a grid-connection voltage protection range.

In the case of any one of the situations where the grid-connection module 103 is in the non-working state, the electric appliance 102 is in the working state, and the power generation module is in the non-working state, it is the non-all-photovoltaic power generation mode in which the electric appliance 102 is operating. To ensure operation safety of the electric appliance 102, the voltage protection range of the system is set to the second voltage protection range, which is an operating voltage protection range of the electric appliance 102, so that the effect of compatibility of protection values is achieved, and the system performance is improved.

To further improve the system performance and facilitate the management of the electric energy generated by the photovoltaic power generation module 101, in an optional embodiment, when the system is in the non-all-photovoltaic power generation mode, the electric energy generated by the photovoltaic power generation module 101 and the electric energy required for operation of the electric appliance 102 can deployed and controlled. In some embodiments, using an air conditioner 102' as an example for description, specifically: determining whether the electric energy generated by the photovoltaic power generation module 101 is greater than the electric energy used for the air conditioner 102'; if the electric energy generated by the photovoltaic power generation module 101 is greater than the electric energy used for the air conditioner 102', determining whether an upper limit value of the second protection range is greater than an upper limit value of the first protection range, and if the upper limit value of the second voltage protection range is greater than the upper limit value of the first voltage protection range, the photovoltaic power generation module 101 is controlled to operate at a limited power.

If the upper limit of the second protection range is less than the upper limit of the first protection range, switching the voltage protection range of the photovoltaic air conditioner system to the first voltage protection range, and using the electric energy generated by the photovoltaic power generation module 101 for providing electric energy to the air conditioner 102' and for feeding to the grid through the grid-connection module 103. This not only can make full use of the energy, but also can achieve better compatibility of the voltage protection range required for grid connection and the protection range required for operation of the air conditioner 102'. If the electric energy generated by the photovoltaic power generation module 101 is less than the electric energy consumption of the air conditioner 102', the electric energy generated by the photovoltaic power generation module 101 is controlled to be completely used for providing electric energy to the air conditioner 102', and electric energy is supplemented from the power grid for use by the air conditioner 102'. In some embodiments, AC power of the power grid can be converted into DC power for the air conditioner 102' by an alternating current-direct current (AC-DC) conversion module so as to be used by the air conditioner 102'.

Before acquiring the work states of photovoltaic power generation module 101, the electric appliance 102, and the grid-connection module 103, that is, before processing of the voltage protection range, the system can be initialized. Specifically, the system starts an initialization task, and it is determined whether the system initialization task is completed or whether the system initialization task is abnormal. If an abnormality occurs, a system fault indicator reports a corresponding fault type and displays the same correspondingly to be identified by the user, and a rated working voltage of the electric appliance 102 is configured. Specifically, the so-called working voltage may be fixed at the factory, or may also be set by a program in a procedure such that different voltage protection values during grid connection and the use of the electric appliance 102 are compatible in processing. For the specific processing procedure for compatibility of different voltage protection values, reference can be made to the description of steps S21 to S28 in the foregoing embodiment.

Figure 3:
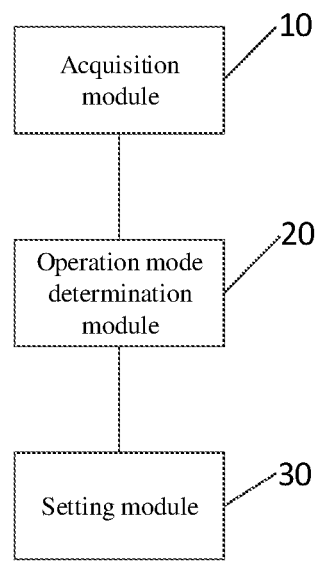
FIG. 3 shows a schematic diagram of some embodiments of a device of controlling a voltage protection value of a photovoltaic electric appliance system provided in the present disclosure.

Some embodiments of the present disclosure further provides a device of controlling a voltage protection value of a photovoltaic electric appliance system, the photovoltaic electric appliance system including a photovoltaic power generation module 101, an electric appliance 102, and a grid-connection module 103, the device as shown in FIG. 3, including: an acquisition module 10 configured to acquire work states of the photovoltaic power generation module 101, the electric appliance 102 and the grid-connection module 103; an operation mode determination module 20 configured to determine an operation mode of the photovoltaic electric appliance system according to the work states of the photovoltaic power generation module 101, the electric appliance 102 for operation and the grid-connection module 103, in some embodiments, the operation mode including: a mode in which the electric energy generated by the photovoltaic power generation module 101 is completely fed to the grid through the grid-connection module 103, or a mode in which the electric energy generated by the photovoltaic power generation module 101 is partially or completely supplied to the electric appliance 102; and a setting module 30 configured to set a voltage protection range of the photovoltaic electric appliance system according to the operation mode.

In some embodiments, in the case where the grid-connection module 103 is in a working state, the electric appliance 102 is in a non-working state, and the photovoltaic power generation module 101 is in a working state, the operation mode determination module 20 determines that the operation mode of the photovoltaic electric appliance system is an all-photovoltaic power generation mode. In the case where the electric energy generated by the photovoltaic power generation module 101 is completely fed to the grid through the grid-connection module 103, the configuration module 30 sets the voltage protection range of the photovoltaic electric appliance system to a first voltage protection range, wherein the first voltage protection range is used for protection when the electric energy generated by the photovoltaic power generation module 101 is completely fed to the grid through the grid-connection module 103.

In the case where the grid-connection module 103 is in a non-working state, and at least one of the electric appliance 102 in a working state or the photovoltaic power generation module 101 in a non-working state is satisfied, the operation mode determination module 20 determines that the operation mode of the photovoltaic electric appliance system is a non-all-photovoltaic power generation mode in which the electric energy generated by the photovoltaic power generation module 101 is partially or completely supplied to the electric appliance 102; and the setting module 30 sets the voltage protection range of the photovoltaic electric appliance system as a second voltage protection range in the non-all-photovoltaic power generation mode. The second voltage protection range is used for protection in the case where the electric energy generated by the photovoltaic power generation module 101 is supplied to the electric appliance 102.

After setting the voltage protection range of the photovoltaic electric appliance system as the second voltage protection range, the setting module 30 sets a voltage range for operation of the electric appliance 102 according to the second voltage protection range, wherein the voltage range for operation of the electric appliance 102 is less than or equal to the second voltage protection range.

In some embodiments, the setting module 30 sets the voltage protection range of the photovoltaic electric appliance system as the first voltage protection range in the all-photovoltaic power generation mode, and sets the voltage protection range of the photovoltaic electric appliance system to the second voltage protection range in the non-all-photovoltaic power generation mode. In the case where the operation mode of the photovoltaic electric appliance system is in the non-all-photovoltaic power generation mode in which the electric energy generated by the photovoltaic power generation module 101 is completely supplied to the electric appliance 102, the setting module 30 determines whether the electric energy generated by the photovoltaic power generation module 101 is greater than electric energy consumption of the electric appliance 102; if the electric energy generated by the photovoltaic power generation module 101 is greater than the electric energy consumption of the electric appliance 102, it determines whether an upper limit of the second protection range is greater than an upper limit of the first protection range, and if so, the setting module 30 controls the photovoltaic power generation module 101 to operate at a limited power.

If the upper limit of the second protection range is less than the upper limit of the first protection range, the setting module 30 switches the voltage protection range of the photovoltaic air conditioner system to the first voltage protection range, and the electric energy generated by the photovoltaic power generation module 101 is used for providing electric energy to the air conditioner 102' and for feeding to the grid through the grid-connection module 103 at the same time. If the electric energy generated by the photovoltaic power generation module 101 is less than the electric energy consumption of the electric appliance 102, the setting module 30 controls the electric energy generated by the photovoltaic power generation module 101 to be completely used for providing electric energy to the electric appliance 102, and supplement electric energy from the power grid for use by the electric appliance 102.

Figure 4:
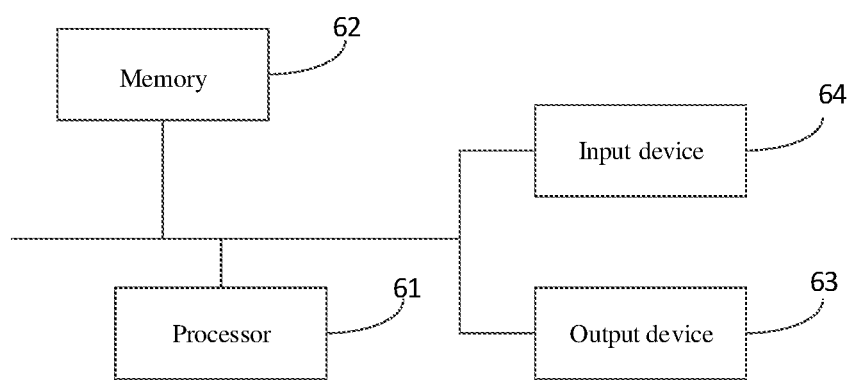
FIG. 4 shows a schematic diagram of some embodiments of a controller provided in the present disclosure.

Some embodiments of the present disclosure provides a controller 107, as shown in FIG. 4 and FIG. 6. The controller 107 includes one or more processors 61 and a memory 62. One processor 63 is used as an example in FIG. 4.

The controller 107 may further include: an input device 63 and an output device 64.

The processor(s) 61, the memory 62, the input device 63 and the output device 64 may be connected via a bus or by other means. Connection via a bus is used in FIG. 4 as an example.

The processor 61 may be a central processing unit (CPU). The processor 61 may also be other general-purpose processor, a digital signal processor (DSP), an application specific integrated circuit (ASIC), a field-programmable gate array (FPGA), or other programmable logic device, a discrete gate or transistor logic device, a discrete hardware component or other chip, or a combination of the above-mentioned various types of chips. The general-purpose processor may be a microprocessor, or the processor may also be any conventional processor or the like.

The memory 62, as a non-transitory computer readable storage medium, may be used to store non-transitory software programs, non-transitory computer executable programs and modules, such as program instructions/modules corresponding to the method of controlling a voltage protection value of a photovoltaic electric appliance system in an embodiment of the present application. The processor 61 runs the non-transitory software programs, instructions and modules stored in the memory 62 to execute various function applications of a server and data processing, i.e., implementing the method of controlling a voltage protection value of a photovoltaic electric appliance system in the above method embodiment.

The memory 62 may include a program storing area and a data storing area, wherein the program storing area may store an operating system, and an application program required for at least one function; and the data storing area may store data created in the use of a processing device according to operations of a user terminal, and the like. In addition, the memory 62 may include a high-speed random access memory, and may also include a non-transitory memory, such as at least one magnetic disk storage device, flash memory device, or other non-transitory solid-state storage device. In some embodiments, the memory 62 optionally includes memories arranged remotely relative to the processor 61, and these remote memories may be connected to an image detecting and processing device by network connection. Examples of the network described above include, but are not limited to, the Internet, an intranet, a local area network, a mobile communication network and combinations thereof.

The input device 63 may receive input numerical or character information and produce a key signal input related to user settings and functional control of the processing device of the user terminal. The output device 64 may include a display device such as a display screen.

One or more modules are stored in the memory 62, and when executed by the one or more processors 61, execute the method as shown in FIG. 1 or 2.

An embodiment of the present application further provides a non-transitory computer readable storage medium, storing computer instructions configured to cause a computer to execute the method of controlling a voltage protection value of a photovoltaic electric appliance system in any implementation of above embodiment. The storage medium may be a magnetic disk, an optical disk, a read-only memory (ROM), a random access memory (RAM), a flash memory, a hard disk drive (HDD), a solid-state drive (SSD), or the like; and the storage medium may also include a combination of the aforementioned types of storage.

Some embodiments of the present disclosure further provides a photovoltaic air conditioner system 100', which includes: a photovoltaic power generation module 101, an air conditioner, a grid-connection module 103, a detection module 105, and a controller 107 described in above embodiment. The photovoltaic power generation module 101 is connected to the air conditioner and the grid-connection module 103 respectively, for supplying power to at least one of a power grid or the air conditioner; and the detection module 105 is connected to the photovoltaic power generation module 101, the air conditioner 102', and the grid-connection module 103 respectively, for detecting work states of the photovoltaic power generation module 101, the air conditioner 102', and the grid-connection module 103. The communication module 106 is connected to the photovoltaic power generation module 101, the air conditioner 102', the grid-connection module 103, the detection module 105, and the controller 107 respectively, for providing communication paths.

Although the embodiments of the present disclosure are described with reference to the accompanying drawings, those skilled in the art can make various modifications and variations without departing from the spirit and scope of the present disclosure, and such modifications and variations fall within the scope of the appended claims.

What is claimed is:

1. A method for controlling a voltage protection value of a photovoltaic electric appliance system, the photovoltaic electric appliance system comprising: a photovoltaic power generation module, an electric appliance, and a grid-connection module, electric energy generated by the photovoltaic power generation module being used for at least one of supplying to the electric appliance or feeding to an alternating current through the grid-connection module, the method comprising:

acquiring work states of the photovoltaic power generation module, the electric appliance, and the grid-connection module;

determining an operation mode of the photovoltaic electric appliance system according to the work states of the photovoltaic power generation module, the electric appliance and the grid-connection module, the operation mode comprising: an all-photovoltaic power generation mode in which the electric energy generated by the photovoltaic power generation module is completely fed to the alternating current grid through the grid-connection module, or a non-all-photovoltaic power generation mode in which the electric energy generated by the photovoltaic power generation module is at least partially supplied to the electric appliance, or in which the photovoltaic power generation module is turned off and the alternating current grid is used to provide electric energy for operation of the electric appliance; and setting a voltage protection range of the photovoltaic electric appliance system according to the operation mode.

2. The method according to claim 1, wherein determining the operation mode of the photovoltaic electric appliance system according to the work states of the photovoltaic power generation module, the electric appliance and the grid-connection module comprises:

determining work states of the photovoltaic power generation module, the electric appliance, and the grid-connection module, respectively;

where the grid-connection module is in a working state, the electric appliance is in a non-working state, and the photovoltaic power generation module is in a working state, determining that the operation mode of the photovoltaic electric appliance system is the all-photovoltaic power generation mode; and setting the voltage protection range of the photovoltaic electric appliance system according to the operation mode comprises:

in the case where the electric energy generated by the photovoltaic power generation module is completely fed to the grid through the grid-connection module, setting the voltage protection range of the photovoltaic electric appliance system as a first voltage protection range, and wherein the first voltage protection range is used for protection in the case where the electric energy generated by the photovoltaic power generation module is completely fed to the grid through the grid-connection module.

3. The method according to claim 2, wherein determining the operation mode of the photovoltaic electric appliance system according to the work states of the photovoltaic power generation module, the electric appliance and the grid-connection module comprises:

where the grid-connection module is in a non-working state, the electric appliance is in a working state, or the photovoltaic power generation module is in a non-working state, determining that the operation mode of the photovoltaic electric appliance system is the non-all-photovoltaic power generation mode in which the electric energy generated by the photovoltaic power generation module is at least partially supplied to the electric appliance for operation; and setting the voltage protection range of the photovoltaic electric appliance system according to the operation mode comprises:

in the non-all-photovoltaic power generation mode, setting the voltage protection range of the photovoltaic electric appliance system as a second voltage protection range, wherein the second voltage protection range is used for protection in the case where the electric energy generated by the photovoltaic power generation module is supplied to the electric appliance.

4. The method according to claim 3, further comprising:

setting a voltage range for operation of the electric appliance according to the second voltage protection range after setting the voltage protection range of the photovoltaic electric appliance system as the second voltage protection range, wherein the voltage range for operation of the electric appliance is less than or equal to the second voltage protection range.

5. The method according to claim 1, wherein setting the voltage protection range of the photovoltaic electric appliance system according to the operation mode comprises:

setting the voltage protection range of the photovoltaic electric appliance system as a first voltage protection range in the all-photovoltaic power generation mode, and setting the voltage protection range of the photovoltaic electric appliance system as a second voltage protection range in the non-all-photovoltaic power generation mode; and where the operation mode of the photovoltaic electric appliance system is the non-all-photovoltaic power generation mode in which the electric energy is completely supplied to the electric appliance for operation, the method further comprises:

determining whether the electric energy generated by the photovoltaic power generation module is greater than electric energy consumption of the electric appliance;

determining whether an upper limit of the second protection range is greater than an upper limit of the first protection range when the electric energy generated by the photovoltaic power generation module is greater than the electric energy consumption of the electric appliance;

then, controlling the photovoltaic power generation module to operate at a limited power.

6. The method according to claim 5, further comprising:

when the upper limit of the second protection range is less than the upper limit of the first protection range, switching the voltage protection range of the photovoltaic electric appliance system to the first voltage protection range, and supplying the electric energy generated by the photovoltaic power generation module to the electric appliance and feeding the electric energy to the grid through the grid-connection module at the same time.

7. The method according to claim 6, further comprising:

when the electric energy generated by the photovoltaic power generation module is less than the electric energy consumption of the electric appliance, causing the electric energy generated by the photovoltaic power generation module to be completely supplied to the electric appliance, and supplementing electric energy from the alternating current grid for use by the electric appliance.

8. The method according to claim 5, further comprising: when the electric energy generated by the photovoltaic power generation module is less than the electric energy consumption of the electric appliance, causing the electric energy generated by the photovoltaic power generation module to be completely supplied to the electric appliance, and supplementing electric energy from the alternating current grid for use by the electric appliance.

9. A controller, comprising: at least one processor; and a memory communicably connected with the at least one processor, wherein the memory stores instructions executable by the at least one processor, and the instructions are executed by the at least one processor, so as to cause the at least one processor to execute the method of controlling the voltage protection value of the photovoltaic electric appliance system according to claim 1.

10. The photovoltaic electric appliance system, comprising:
the photovoltaic power generation module, the electric appliance, the grid-connection module, the detection module, and the controller of claim 9, wherein
the photovoltaic power generation module is connected to the electric appliance and the grid-connection module to supply power to at least one of the alternating current grid or the electric appliance; and
the detection module is connected to the photovoltaic power generation module, the electric appliance, and the grid-connection module, to detect work states of the photovoltaic power generation module, the electric appliance, and the grid-connection module.

11. The photovoltaic electric appliance system according to claim 10, wherein the electric appliance comprises at least one of an air conditioner, a refrigerator, a washing machine, or a fan.

12. The controller according to claim 9, wherein
determining the operation mode of the photovoltaic electric appliance system according to the work states of the photovoltaic power generation module, the electric appliance and the grid-connection module comprises:
determining work states of the photovoltaic power generation module, the electric appliance, and the grid-connection module, respectively;
in the case where the grid-connection module is in a working state, the electric appliance is in a non-working state, and the photovoltaic power generation module is in a working state, determining that the operation mode of the photovoltaic electric appliance system is the all-photovoltaic power generation mode; and
setting the voltage protection range of the photovoltaic electric appliance system according to the operation mode comprises:
where the electric energy generated by the photovoltaic power generation module is completely fed to the grid through the grid-connection module, setting the voltage protection range of the photovoltaic electric appliance system as a first voltage protection range, and
wherein the first voltage protection range is used for protection in the case where the electric energy generated by the photovoltaic power generation module is completely fed to the grid through the grid-connection module.

13. The controller according to claim 12, wherein
determining the operation mode of the photovoltaic electric appliance system according to the work states of the photovoltaic power generation module, the electric appliance and the grid-connection module comprises:
where the grid-connection module is in a non-working state, the electric appliance is in a working state, or the photovoltaic power generation module is in a non-working state, determining that the operation mode of the photovoltaic electric appliance system is the non-all-photovoltaic power generation mode in which the electric energy generated by the photovoltaic power generation module is at least partially supplied to the electric appliance for operation; and
setting the voltage protection range of the photovoltaic electric appliance system according to the operation mode comprises:
in the non-all-photovoltaic power generation mode, setting the voltage protection range of the photovoltaic electric appliance system as a second voltage protection range, wherein the second voltage protection range is used for protection in the case where the electric energy generated by the photovoltaic power generation module is supplied to the electric appliance.

14. The controller according to claim 13, wherein
determining the operation mode of the photovoltaic electric appliance system according to the work states of the photovoltaic power generation module, the electric appliance and the grid-connection module comprises further comprises:
setting a voltage range for operation of the electric appliance according to the second voltage protection range after setting the voltage protection range of the photovoltaic electric appliance system as a second voltage protection range,
wherein the voltage range for operation of the electric appliance is less than or equal to the second voltage protection range.

15. The controller according to claim 9, wherein setting the voltage protection range of the photovoltaic electric appliance system according to the operation mode comprises:
setting the voltage protection range of the photovoltaic electric appliance system as a first voltage protection range in the all-photovoltaic power generation mode, and setting the voltage protection range of the photovoltaic electric appliance system as a second voltage protection range in the non-all-photovoltaic power generation mode; and
where the operation mode of the photovoltaic electric appliance system is the non-all-photovoltaic power generation mode in which the electric energy is completely supplied to the electric appliance for operation, the method further comprises:
determining whether the electric energy generated by the photovoltaic power generation module is greater than electric energy consumption of the electric appliance; and
determining whether an upper limit of the second protection range is greater than an upper limit of the first protection range when the electric energy generated by the photovoltaic power generation module is greater than the electric energy consumption of the electric appliance;

then, controlling the photovoltaic power generation module to operate at a limited power.

16. The method according to claim 1, wherein determining the operation mode of the photovoltaic electric appliance system according to the work states of the photovoltaic power generation module, the electric appliance and the grid-connection module comprises:
    determining the work states of the photovoltaic power generation module, the electric appliance, and the grid-connection module, respectively;
    where the grid-connection module is in a non-working state, the electric appliance is in a working state, and the photovoltaic power generation module is in a non-working state, determining that the operation mode of the photovoltaic electric appliance system is the non-all-photovoltaic power generation mode in which the electric energy generated by the photovoltaic power generation module is at least partially supplied to the electric appliance for operation; and
    setting a voltage protection range of the photovoltaic electric appliance system according to the operation mode comprises:
    in the non-all-photovoltaic power generation mode, setting the voltage protection range of the photovoltaic electric appliance system as a second voltage protection range, wherein the second voltage protection range is used for protection in the case where the electric energy generated by the photovoltaic power generation module is supplied to the electric appliance.

17. A non transitory storage medium for storing computer program instructions, wherein the instructions, when executed by a processor, implement the method of controlling the voltage protection value of the photovoltaic electric appliance system according to claim 1.

18. A method for controlling a voltage protection value of a photovoltaic electric appliance system, the photovoltaic electric appliance system comprising a photovoltaic power generation module, an electric appliance, and a grid-connection module, electric energy generated by the photovoltaic power generation module being used for at least one of supplying to the electric appliance, or feeding to a grid through the grid-connection module, the method comprising:
    acquiring work states of the photovoltaic power generation module, the electric appliance, and the grid-connection module;
    determining an operation mode of the photovoltaic electric appliance system according to the work states; and
    setting a voltage protection range of the photovoltaic electric appliance system according to the operation mode.

19. A device for controlling voltage protection value of the photovoltaic electric appliance system, for executing the method of claim 18, the photovoltaic electric appliance system comprising: the photovoltaic power generation module, the electric appliance, and the grid-connection module, wherein the device comprises:
    an acquisition module configured to acquire the work states of the photovoltaic power generation module, the electric appliance, and the grid-connection module;
    an operation mode determination module configured to determine the operation mode of the photovoltaic electric appliance system according to the work states; and
    a setting module configured to set the voltage protection range of the photovoltaic electric appliance system according to the operation mode.

20. A device for controlling a voltage protection value of a photovoltaic electric appliance system, the photovoltaic electric appliance system comprising a photovoltaic power generation module, an electric appliance, and a grid-connection module, the device comprising:
    an acquisition module configured to acquire work states of the photovoltaic power generation module, the electric appliance, and the grid-connection module;
    an operation mode determination module configured to determine an operation mode of the photovoltaic electric appliance system according to the work states of the photovoltaic power generation module, the electric appliance and the grid-connection module, the operation mode comprising: a mode in which the electric energy generated by the photovoltaic power generation module is completely fed to a grid through the grid-connection module, or a mode in which the electric energy generated by the photovoltaic power generation module is at least partially supplied to the electric appliance for operation; and
    a setting module configured to set a voltage protection range of the photovoltaic electric appliance system according to the operation mode.

* * * * *

UNITED STATES PATENT AND TRADEMARK OFFICE
CERTIFICATE OF CORRECTION

PATENT NO. : 11,831,151 B2  
APPLICATION NO. : 17/287919  
DATED : November 28, 2023  
INVENTOR(S) : Zhigang Zhao et al.

Page 1 of 1

It is certified that error appears in the above-identified patent and that said Letters Patent is hereby corrected as shown below:

On the Title Page

Column 2, Abstract, Line 6, delete "comprises-:" and insert -- comprises: --

In the Claims

Column 13, Line 11, Claim 1, delete "current" and insert -- current grid --

Column 17, Line 29, Claim 17, delete "non" and insert -- non- --

Column 18, Line 6, Claim 19, delete "controlling" and insert -- controlling the --

Signed and Sealed this  
Thirtieth Day of January, 2024

Katherine Kelly Vidal  
*Director of the United States Patent and Trademark Office*